(12) United States Patent
Kobori et al.

(10) Patent No.: US 10,452,950 B2
(45) Date of Patent: Oct. 22, 2019

(54) OBJECT RECOGNITION APPARATUS, OBJECTION RECOGNITION METHOD, AND PROGRAM

(71) Applicant: TOYOTA JIDOSHA KABUSHIKI KAISHA, Toyota-shi (JP)

(72) Inventors: Norimasa Kobori, Nagoya (JP); Kunimatsu Hashimoto, Nagakute (JP); Minoru Yamauchi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 69 days.

(21) Appl. No.: 15/591,690

(22) Filed: May 10, 2017

(65) Prior Publication Data

US 2017/0344850 A1 Nov. 30, 2017

(30) Foreign Application Priority Data

May 25, 2016 (JP) ................. 2016-104124

(51) Int. Cl.
*G06K 9/00* (2006.01)
*G06K 9/62* (2006.01)
(Continued)

(52) U.S. Cl.
CPC ....... *G06K 9/6202* (2013.01); *G06K 9/00201* (2013.01); *G06K 9/6215* (2013.01);
(Continued)

(58) Field of Classification Search
CPC . G06K 9/6202; G06K 9/00201–00288; G06K 9/00577; G06K 9/00664;
(Continued)

(56) References Cited

U.S. PATENT DOCUMENTS 9,424,461 B1 * 8/2016 Yuan ................. G06K 9/00201
2003/0035098 A1 2/2003 Ishiyama
(Continued)

FOREIGN PATENT DOCUMENTS

JP 2003-58896 2/2003
JP 2008-15895 1/2008
(Continued)

OTHER PUBLICATIONS

Paul J. Besl, et al. "A Method for Registration of 3-D Shapes", IEEE Transactions on Pattern Analysis and Machine Intelligence, vol. 14, No. 2, 1992, pp. 239-256.
(Continued)

*Primary Examiner* — Jose L Couso
(74) *Attorney, Agent, or Firm* — Oblon, McClelland, Maier & Neustadt, L.L.P.

(57) ABSTRACT

An object recognition apparatus includes image information acquisition means for acquiring image information of an object to be recognized, storage means for storing detection profile information associating an object candidate with a detector capable of detecting the object candidate, and model image information of the object candidate associated with the object candidate and object detection means including detectors defined in the detection profile information, the object detection means detecting the object to be recognized by using the detector from the image information acquired by the image information acquisition means. The detector of the object detection means detects the object candidate by comparing the model image information of the object candidate associated with the detector in the detection profile information with the image information of the object to be recognized acquired by the image information acquisition means, and outputs the detected object candidate as the object to be recognized.

9 Claims, 13 Drawing Sheets

(51) Int. Cl.
*G06T 7/73* (2017.01)
*G06T 7/246* (2017.01)

(52) U.S. Cl.
CPC ............ *G06K 9/6276* (2013.01); *G06T 7/248* (2017.01); *G06T 7/74* (2017.01)

(58) Field of Classification Search
CPC .. G06K 9/3208; G06K 9/3216; G06K 9/3241; G06K 9/62–6215; G06K 9/00718; G06K 9/6267–6287; G06K 9/4671; G06K 9/626; G06K 9/6262; G06K 2209/3291; G06T 7/74; G06T 7/248; G06T 7/73; G06T 7/75; G06T 17/00; G06T 2207/30244; G06T 2207/30204; G06T 2207/20004; H04N 13/204; H04N 2213/003; G01B 11/24; G06F 17/30247; G06F 17/30256; G06F 17/30259; G06F 19/00; G06N 3/086; G06N 99/005
See application file for complete search history.

(56) References Cited

U.S. PATENT DOCUMENTS

| | | | | |
|---|---|---|---|---|
| 2011/0286628 | A1* | 11/2011 | Goncalves | G06F 17/30256 382/103 |
| 2015/0016712 | A1* | 1/2015 | Rhoads | G06K 9/00208 382/154 |
| 2015/0023602 | A1* | 1/2015 | Wnuk | G06F 17/30247 382/190 |
| 2015/0109338 | A1* | 4/2015 | McKinnon | G06F 17/30244 345/633 |
| 2015/0278579 | A1* | 10/2015 | Saklatvala | G06K 9/6201 382/203 |
| 2016/0117824 | A1 | 4/2016 | Amma et al. | |
| 2016/0180195 | A1* | 6/2016 | Martinson | G06K 9/6256 382/103 |
| 2016/0342863 | A1* | 11/2016 | Kwon | G06K 9/4647 |
| 2018/0137390 | A1* | 5/2018 | Brundage | G06K 9/00624 |
| 2019/0034557 | A1* | 1/2019 | Alsallakh | G06F 16/583 |
| 2019/0035431 | A1* | 1/2019 | Attorre | H04N 21/23418 |
| 2019/0043201 | A1* | 2/2019 | Strong | G06K 9/6228 |

FOREIGN PATENT DOCUMENTS

| | | |
|---|---|---|
| JP | 2012-203668 A | 10/2012 |
| JP | 2013-54547 | 3/2013 |
| JP | 2013-158845 A | 8/2013 |
| JP | 2015-56057 | 3/2015 |
| JP | 2015-143951 A | 8/2015 |

OTHER PUBLICATIONS

Lilita Kiforenko, et al. "Object Detection Using a Combination of Multiple 3D Feature Descriptors", LNCS, vol. 9163. 2015, pp. 343-353.

Giacinto, G. et al. "Adaptive Selection of Image Classifiers", Electronics Letters, 1997, pp. 1-8.

Stefan Hinterstoisser et al: "Model Based Training, Detection and Pose Estimation of Texture-Less 3D Objects in Heavily Cluttered Scenes", Nov. 5, 2012, Computer Vision ACCV 2012, pp. 548-562, XP047027004, ISBN: 978-3-642-37330-5.

* cited by examiner

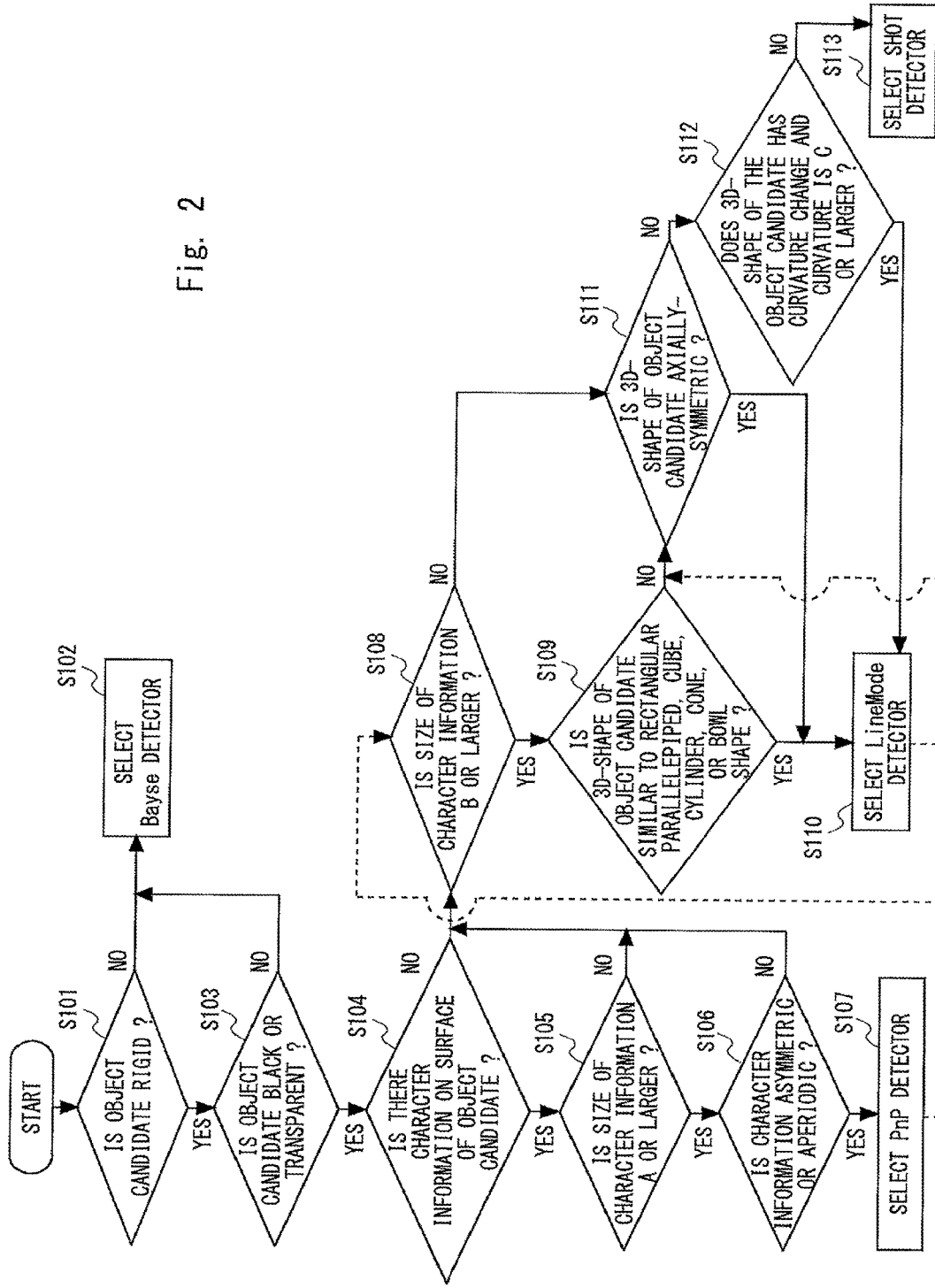

|  |  | LineMode DETECTOR | PnP DETECTOR | SHOT DETECTOR | Bayse DETECTOR |
|---|---|---|---|---|---|
|  | OBJECT CANDIDATE A<br>TELEPHONE STAND<br>EX.) · CONTOUR SHAPE IS CHARACTERISTIC<br>· CERTAIN SIZE OR LARGER | ○ | — | — | — |
|  | OBJECT CANDIDATE B<br>CONFECTIONERY BOX<br>EX.) · THERE IS TEXTURE<br>· BOX SHAPE<br>· CERTAIN SIZE OR LARGER | ○ | ○ | — | — |
|  | OBJECT CANDIDATE C<br>BOWL (BOWL)<br>EX.) · BOWL SHAPE<br>· AXIALLY-SYMMETRIC<br>· GENTLE CURVATURE CHAGE | ○ | — | ○ | — |
| 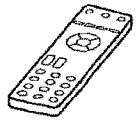 | OBJECT CANDIDATE D<br>REMOTE CONTROLLER<br>EX.) · BLACK | — | — | — | ○ |

Fig. 3

|   |   | HUE DETECTOR | RGB DETECTOR | CLBP DETECTOR | Gray_Scale DETECTOR |
|---|---|---|---|---|---|
|  | OBJECT CANDIDATE A<br>TELEPHONE STAND<br>EX.) · COMPOSITE COLOR OF WHITE AND YELLOW | — | ○ | — | — |
|  | OBJECT CANDIDATE B<br>CONFECTIONERY BOX<br>EX.) · TEXTURE | — | — | ○ | — |
|  | OBJECT CANDIDATE C<br>BOWL (BOWL)<br>EX.) · WHITE-BASED COLOR | — | — | — | ○ |
| 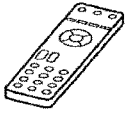 | OBJECT CANDIDATE D<br>REMOTE CONTROLLER<br>EX.) · BLACK | — | ○ | — | — |
|  | OBJECT CANDIDATE E<br>CUP<br>EX.) · YELLOW | ○ | — | — | — |

Fig. 8

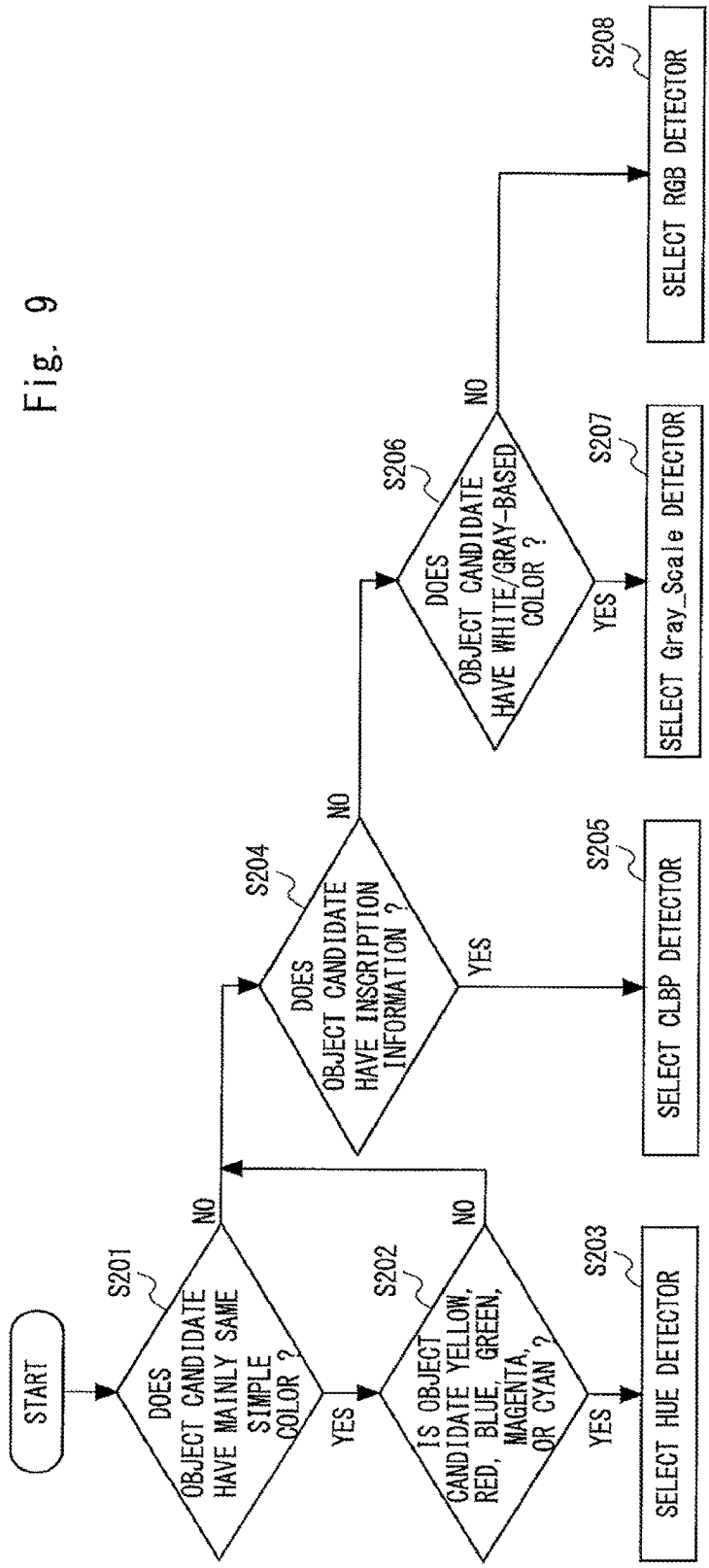

point-to-point
(ASSOCIATION BY Closest Point)

OBJECT RECOGNITION APPARATUS, OBJECTION RECOGNITION METHOD, AND PROGRAM

CROSS REFERENCE TO RELATED APPLICATIONS

This application is based upon and claims the benefit of priority from Japanese patent application No. 2016-104124, filed on May 25, 2016, the disclosure of which is incorporated herein in its entirety by reference.

TECHNICAL FIELD

The present disclosure relates to an object recognition apparatus, an objection recognition method, and a program for recognizing an object.

BACKGROUND

An apparatus that detects a position and a posture (hereinafter referred to as "position/posture") of an object based on contour information extracted from a photographic image of the object has been known (see Japanese Unexamined Patent Application Publication No. 2008-015895).

SUMMARY

The present inventors have found the following problem. It should be noted that for a detector such as the above-described detector, there are objects that the detector is good at detecting and those that the detector is not good at detecting (e.g., objects having unique contours, objects having small thicknesses, and the like). Therefore, depending on the detector used, there is a possibility that an object cannot be detected, i.e., is undetected.

The present disclosure has been made to solve the above-described problem and a main object thereof is to provide an object recognition apparatus, an objection recognition method, and a program capable of preventing objects from being undetected and thereby improving recognition accuracy.

To achieve the above-described object, a first exemplary aspect is an object recognition apparatus including: image information acquisition means for acquiring image information of an object to be recognized; storage means for storing detection profile information associating an object candidate with a detector capable of detecting the object candidate, and model image information of the object candidate associated with the object candidate, the object candidate being a candidate for the object to be recognized; and object detection means including a plurality of detectors defined in the detection profile information, the object detection means being configured to detect the object to be recognized by using the detector based on the image information acquired by the image information acquisition means, in which each of the detectors of the object detection means detects the object candidate by comparing the model image information of the object candidate associated with the detector in the detection profile information with the image information of the object to be recognized acquired by the image information acquisition means, and outputs the detected object candidate as the object to be recognized.

In this aspect, the storage means may store determination profile information associating the object candidate with a determination unit capable of determining the object candidate. The object recognition apparatus may further include object determination means including a plurality of determination units defined in the determination profile information, the object determination means being configured to determine the object candidate output from the object detection means based on the image information acquired by the image information acquisition means by using the determination unit. The object determination means may: select a determination unit corresponding to the object candidate detected by the object detection means based on the determination profile information stored in the storage means; determine whether or not the object candidate has reliability equal to or larger than a predetermined value by comparing at least one of color information and distance information of the image information of the object to be recognized acquired by the image information acquisition means with at least one of color information and distance information of the model image information of the object candidate output from the object detection means; and output the object candidate that is determined to have reliability equal to or larger than the predetermined value as the object to be recognized.

In this aspect, the object detection means may detect a position/posture candidate of the object candidate based on a feature value of the image information of the object to be recognized acquired by the image information acquisition means and a feature value of the model image information of the detected object candidate.

In this aspect, the object recognition apparatus may further include clustering process means for unifying similar candidates among object candidates and position/posture candidates detected by the object detection means as an identical candidate.

In this aspect, the object recognition apparatus may further include tracking process means for performing a tracking process and outputting a tracking-processed object candidate and its position/posture candidate, the tracking process being a process for obtaining a geometric quantity between a model of a model image of the object candidate and the position/posture candidate detected by the object detection means and the object to be recognized of the image information, and eliminating an object candidate and a position/posture candidate for which the obtained geometric quantity is equal to or larger than a predetermined quantity from the object candidates and the position/posture candidates detected by the object detection means.

In this aspect, the storage means may store information of a nearest neighbor point on the model in the model image from each grid of a three-dimensional voxel enclosing the model to the model, and the tracking process means may perform the tracking process by using the information of the nearest neighbor point stored in the storage means.

In this aspect, the object recognition apparatus may further include profile information generation means for generating at least one of the detection profile information and the determination profile information, the detection profile information associating the object candidate with at least one detector based on feature information indicating a feature of the object candidate including at least one of color information, shape information, inscription information, and physical-property information of the object candidate, the object candidate being a candidate for the object to be recognized, the determination profile information associating the object candidate with at least one determination unit based on feature information indicating a feature of the object candidate including at least one of color information and inscription information of the object candidate.

To achieve the above-described object, another exemplary aspect may be an object recognition method comprising: a step of acquiring image information of an object to be recognized; and a step of detecting the object to be recognized by using detectors based on the acquired image information, the detectors defined in detection profile information associating an object candidate with the detector capable of detecting the object candidate, the object candidate being a candidate for the object to be recognized, wherein each of the detectors detects the object candidate by comparing the model image information of the object candidate associated with the detector in the detection profile information with the acquired image information of the object to be recognized, and outputs the detected object candidate as the object to be recognized.

To achieve the above-described object, another exemplary aspect may be a program for causing a computer to execute: a process of acquiring image information of an object to be recognized; and a process of, detecting the object to be recognized by using detectors based on the acquired image information, the detectors defined in detection profile information associating an object candidate with the detector capable of detecting the object candidate, the object candidate being a candidate for the object to be recognized, wherein each of the detectors detects the object candidate by comparing the model image information of the object candidate associated with the detector in the detection profile information with the acquired image information of the object to be recognized, and outputs the detected object candidate as the object to be recognized.

According to the present disclosure, it is possible to provide an object recognition apparatus, an objection recognition method, and a program capable of preventing objects from being undetected and thereby improving recognition accuracy.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 2 shows an example of a process flow for associating object candidates with detectors;

FIG. 3 shows an example of detection profile information associating object candidates with detectors;

FIG. 8 shows an example of determination profile information associating object candidates with determination units;

FIG. 9 shows an example of a process flow for associating object candidates with determination units;

DESCRIPTION OF EMBODIMENTS

First Embodiment

Figure 1:
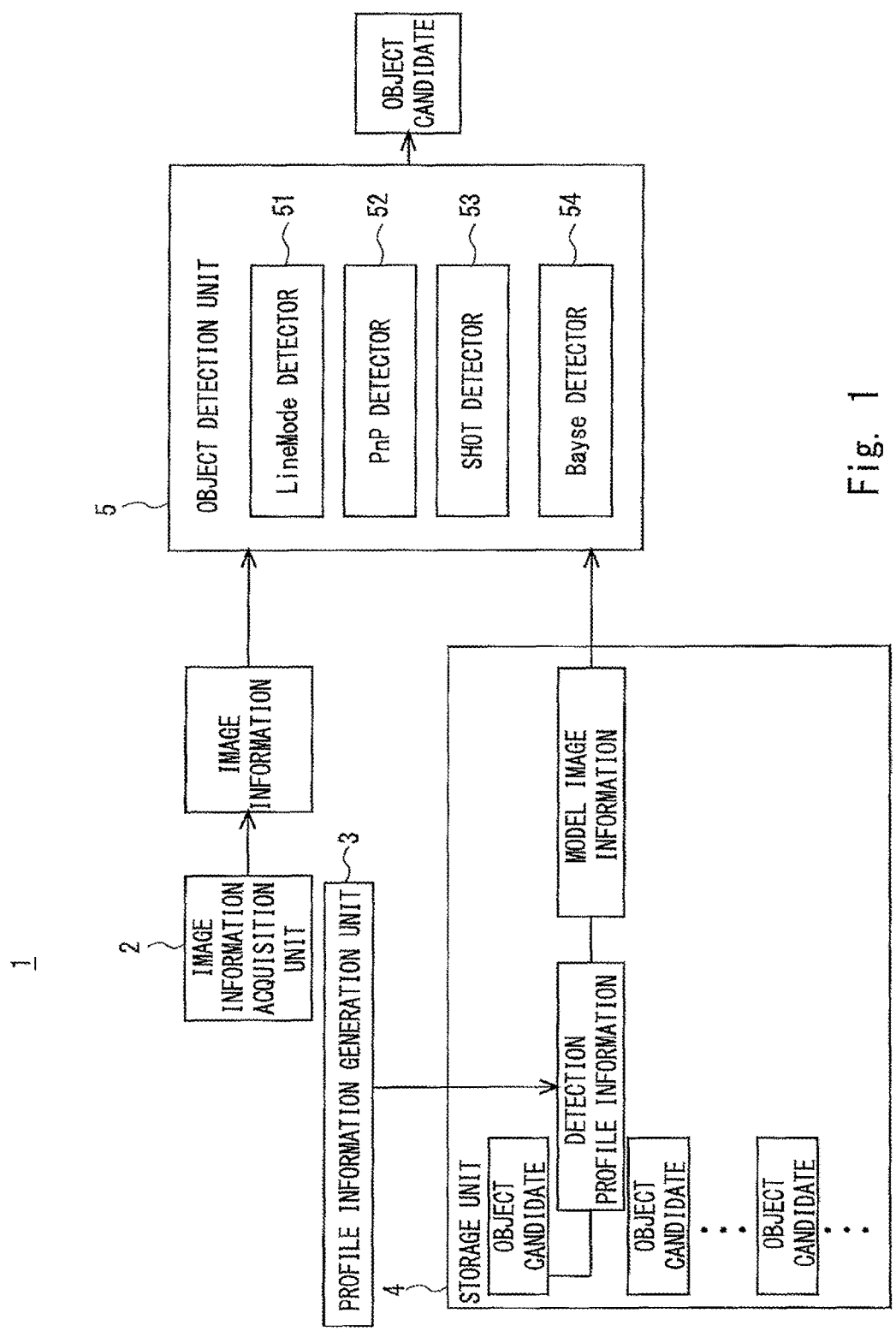
FIG. 1 is a block diagram showing a schematic system configuration of an object recognition apparatus according to a first embodiment of the present disclosure.

Embodiments according to the present disclosure are explained hereinafter with reference to the drawings. FIG. 1 is a block diagram showing a schematic system configuration of an object recognition apparatus according to a first embodiment of the present disclosure. The object recognition apparatus 1 according to the first embodiment is an apparatus that detects an object to be recognized (i.e., a target object to be recognized) having an arbitrary three-dimensional (hereinafter referred to as "3D") shape, and its position and posture (i.e., its position/posture).

For example, the object recognition apparatus 1 may be formed by hardware mainly using a microcomputer including a CPU (Central Processing Unit) that performs arithmetic processing and so on, a memory including a ROM (Read Only Memory) and/or a RAM (Random Access Memory) that stores an arithmetic program and so on to be executed by the CPU, and an interface unit (I/F) that externally receives and outputs signals. The CPU, the memory, and the interface unit are connected with each other through a data bus or the like.

The object recognition apparatus 1 includes an image information acquisition unit 2, a profile information generation unit 3, a storage unit 4, and an object detection unit 5.

The image information acquisition unit 2 is a specific example of the image information acquisition means. The image information acquisition unit 2 acquires image information (including RGB brightness information (color information) and distance information) of an object by using a sensor such as a camera and a range sensor (such as a range-imaging sensor, a millimeter-wave sensor, and an ultrasonic sensor).

The profile information generation unit 3 is a specific example of the profile information generation means. The profile information generation unit 3 generates detection profile information that associates object candidates, which are candidates for objects to be recognized, with detectors that can detect the object candidates and are optimal for detecting the object candidates. In the detection profile information, each object candidate is associated with at least one of detectors having different characteristics. The profile information generation unit 3 selects an optimal detector for detecting an object candidate from a plurality of predefined detectors and associates the object candidate with the selected detector.

Note that the plurality of detectors include, for example, a LineMode detector 51, a PnP detector 52, a SHOT detector 53, and a Bayse detector 54.

The LineMode detector 51 is a detector that performs parallel computation by devising a memory arrangement for a template using a plurality of types of discrete feature values and thereby detects an object at a high speed. For example, the LineMode detector 51 is optimal for detecting an object that has a certain size or larger and has a characteristic contour shape or has a three-dimensional shape such as a rectangular parallelepiped, a cube, a cylinder, a cone, or a bowl shape, e.g., an object such as a telephone stand. Its detailed algorithm is disclosed in, for example, S. Hinterstoisser, C. Cagniart, S. Iiic, P. Sturm, N. Navab, P. Fua, V. Lepetit Gradient Response Maps for Real-Time Detection of Texture-Less Objects IEEE Transactions on Pattern Analysis and Machine Intelligence (TPAMI), and its disclosure is incorporated into this specification by reference.

The PnP detector 52 is a detector using SIFT (Scale-Invariant Feature Transform) or A-KAZE (Accelerated KAZE) feature values. For example, the PnP detector 52 is optimal for detecting an object that has a certain size or larger and has a texture such as a box of confectionery.

The SIFT is disclosed in detail in, for example, David G. Lowe, "Distinctive image features from scale-invariant keypoints," International Journal of Computer Vision, 60, 2 (2004), pp. 91-110, and its disclosure is incorporated into this specification by reference.

The A-KAZE is disclosed in detail in, for example, Fast Explicit Diffusion for Accelerrated Features in Nonlinear Scale Spaces Pablo F. Alcantarilla, Jesus Nuevo and Adrien Bartoli. In British Machine Vision Conference (BMVC). Bristol, UK. September 2013, and its disclosure is incorporated into this specification by reference.

The SHOT detector 53 is a detector using SHOT (Signature of Histograms of OrienTations) feature values. For example, the SHOT detector 53 is optimal for detecting an object that has a curvature change or an axially-symmetric object such as a bowl.

The SHOT is disclosed in detail in, for example, in Tombari et al. Unique signatures of histograms for local surface description. ECCV 2010, and its disclosure is incorporated into this specification by reference.

The Bayse detector 54 is a detector that performs detection based on a network for which local patches have been learned in a Bayesian network. For example, the Bayse detector 54 is optimal for detecting a black or transparent object such as a remote controller, or a non-rigid object.

Note that the above-described detectors 51 to 54 are merely examples and the detectors are not limited to the aforementioned detectors. The profile information generation unit 3 may select other types of detectors such as a HOG (Histograms of Oriented Gradients) detector or a SURF (Speeded Up Robust Features) detector. That is, the number and the type of detectors to be selected may be arbitrarily determined.

The profile information generation unit 3 associates an object candidate with a detector that is optimal for detecting that object candidate based on feature information indicating features of the object candidate including at least one of color information, shape information, inscription information, and physical-property information of the object candidate.

For example, the profile information generation unit 3 selects one of the plurality of predefined detectors 51 to 54 that is optimal for detecting the object candidate and associates the object candidate with the selected one of the detectors 51 to 54 in accordance with, for example, a flowchart shown in FIG. 2.

The profile information generation unit 3 determines whether the object candidate is rigid or not based on the image information of the object candidate acquired by the image information acquisition unit 2 and physical-property information defined in advance in the storage unit 4 (step S101). The physical-property information includes, for example, information associating an object with its physical properties (such as a rigid object and an elastic object) and is defined in advance in the storage unit 4.

When the profile information generation unit 3 determines that the object candidate is not rigid (No at step S101), it selects the Bayse detector 54 (step S102) On the other hand, when the profile information generation unit 3 determines that the object candidate is rigid (Yes at step S101), it determines whether or not the object candidate is black or transparent (step S103).

When the profile information generation unit 3 determines that the object candidate is black or transparent (No at step S103), it selects the Bayse detector 54 (step S102). On the other hand, when the profile information generation unit 3 determines that the object candidate is neither black nor transparent (Yes at step S103), it determines whether or not there is inscription information (including a texture, a symbol, a figure, a hieroglyphic character, and the like) on the surface of the object candidate (step S104).

When the profile information generation unit 3 determines that there is no inscription information on the surface of the object candidate (No at step S104), it moves to a later-described step (moves to a step S108). On the other hand, when the profile information generation unit 3 determines that there is inscription information on the surface of the object candidate (Yes at step S104), it determines whether or not the size of the inscription information (such as a character size, a width, or an area (i.e., a size of an area)) is equal to or larger than a predetermined value A (step S105).

When the profile information generation unit 3 determines that the size of the inscription information of the object candidate is smaller than the predetermined value A (No at step S105), it moves to the later-describe step (to the step S108). On the other hand, when the profile information generation unit 3 determines that the size of the inscription information of the object candidate is equal to or larger than the predetermined value A (Yes at step S105), it determines whether or not the inscription information is asymmetric or aperiodic (step S106).

When the profile information generation unit 3 determines that the inscription information of the object candidate is neither asymmetric nor aperiodic (No at step S106), it moves to the later-described step (to the step S108). On the other hand, when the profile information generation unit 3 determines that the inscription information of the object candidate is asymmetric or aperiodic (Yes at step S106), it selects the PnP detector 52 (step S107).

The profile information generation unit 3 determines whether or not the size of the object candidate (such as a volume, a height, a width, or a lengthwise/crosswise length)) is equal to or larger than a predetermined value B (step S108). When the profile information generation unit 3 determines that the size of the object candidate is equal to or larger than the predetermined value B (Yes at step S108), it determines whether or not the object candidate has a 3D-shape similar to a rectangular parallelepiped, a cube, a cylinder, a cone, or a bowl (step S109). When the profile information generation unit 3 determines that the object candidate has a 3D-shape similar to a rectangular parallelepiped, a cube, a cylinder, a cone, or a bowl shape (Yes at step S109), it selects the LineMode detector 51 (step S110). On the other hand, when the profile information generation unit 3 determines that the object candidate does not has a 3D-shape similar to a rectangular parallelepiped, a cube, a cylinder, a cone, or a bowl (No at step S109), it moves to a later-described step (to a step S111).

When the profile information generation unit 3 determines that the size of the object candidate is smaller than the predetermined value B (No at step S108), it determines whether or not the 3D-shape of the object candidate is axially-symmetric (step S111).

When the profile information generation unit 3 determines that the 3D-shape of the object candidate is not axially-symmetric (Yes at step S111), it selects the LineMode detector 51 (step S110). On the other hand, when the profile information generation unit 3 determines that the 3D-shape of the object candidate is axially-symmetric (No at step S111), it determines whether or not the 3D-shape of the object candidate has a curvature change and the curvature is equal to or larger than a predetermined value C (step S112).

When the profile information generation unit 3 determines that the 3D-shape of the object candidate has a curvature change and the curvature is equal to or larger than the predetermined value C (Yes at step S112), it selects the LineMode detector 51 (step S110). On the other hand, when the profile information generation unit 3 determines that the 3D-shape of the object candidate has no curvature change or the curvature is smaller than the predetermined value C (No at step S112), it selects the SHOT detector 53 (step S113). In this way, by the profile information generation unit 3, it is possible to automatically generate detection profile information that associates an object candidate with one of the detectors 51 to 54 that is optimal for detecting that object candidate based on feature information indicating features of the object candidate including at least one of color information, shape information, inscription information, and physical-property information of the object candidate.

The profile information generation unit 3 generates detection profile information associating an object candidate with the selected one of the detectors 51 to 54 in accordance with the above-described flow and stores the generated detection profile information in the storage unit 4. Note that the object recognition apparatus 1 does not necessarily have to include the profile information generation unit 3. In such a case, detection profile information associating an object candidate with one of the detectors 51 to 54 optimal for detecting that object candidate may be stored in advance in the storage unit 4. Further, a user may select one of the detectors 51 to 54 for each object candidate in accordance with the above-described flowchart and store the selected detection profile information in the storage unit 4. The detection profile information stored in the storage unit 4 can be configured so that, for example, a user can arbitrarily change a definition in the detection profile information.

The storage unit 4 is a specific example of the storage means. The storage unit 4 stores the detection profile information generated by the above-described profile information generation unit 3. Further, the storage unit 4 stores, for example, a plurality of model images indicating 3D-object shapes of object candidates and position/posture candidates (CAD data or the like of objects, including mesh data in which surfaces are added to point cloud data, color information, and the like). The storage unit 4 is formed by, for example, the aforementioned memory.

The object detection unit 5 is a specific example of the object detection means. The object detection unit 5 detects, from image information of an object to be recognized acquired by the image information acquisition unit 2, an object candidate of the object to be recognized and a candidate for its position/posture (a position/posture candidate) by using the detectors 51 to 54.

The object detection unit 5 includes detectors defined in the detection profile information stored in the storage unit 4 (e.g., the LineMode detector 51, the PnP detector 52, the SHOT detector 53, and the Bayse detector 54). The object detection unit 5 detects an object candidate and its position/posture candidate by using these detectors 51 to 54.

It should be noted that for each of the above-described detectors 51 to 54, there are objects that the detector is good at detecting and those that the detector is not good at detecting. For example, the LineMode detector 51 can accurately detect an object that has a certain size or larger and its contour shape is unique. However, there is a possibility that the LineMode detector 51 cannot detect an object when a part of the contour shape of the object cannot be acquired due to a sensor noise or the like or when the object has a small thickness. As described above, depending on the used detector, there is a possibility that an object cannot be detected.

To cope with this problem, in the object recognition apparatus 1 according to the first embodiment, each of the detectors 51 to 54 detects an object candidate by comparing model image information of an object candidate associated with one of the detectors 51 to 54 in the detection profile information with image information of the object to be recognized acquired by the image information acquisition unit 2. Each of the detectors 51 to 54 of the object detection unit 5 outputs the detected object candidate as the object to be recognized.

In this way, the detectors 51 to 54 of the object detection unit 5 are associated with model images of object candidates optimal for their detection. As a result, each of the detectors 51 to 54 detects, by using a model image of an object candidate that is associated therewith and optimal for its detection, only the object candidate optimal for its detection. Consequently, the above-described problem, which is caused because there are objects that the detector is good at detecting and those that the detector is not good at detecting, can be solved, thus making it possible to prevent objects to be recognized from being undetected and thereby to improve the recognition accuracy.

For example, each of the detectors 51 to 54 of the object detection unit 5 (e.g., the LineMode detector 51, the PnP detector 52, the SHOT detector 53, and the Bayse detector 54) acquires a model image of an object candidate associated with that detector from the storage unit 4 based on the detection profile information stored in the storage unit 4. Then, each of the detectors 51 to 54 detects the object candidate by comparing feature values of image information of the object to be recognized (hereinafter also referred to as a "target object image") acquired by the image information acquisition unit 2 with feature values of the model image of the object candidate associated therewith acquired from the storage unit 4.

More specifically, each of the detectors 51 to 54 calculates a correlation value between feature values of the target object image acquired by the image information acquisition unit 2 and feature values of the model image of the object candidate stored in the storage unit 4, and detects the object candidate of the model image for which the calculated correlation value is equal to or larger than a predetermined value as the object to be recognized. In the detection profile information stored in the storage unit 4, one object candidate may be associated with two or more of the detectors 51 to 54. In such a case, these two or more of the detectors 51 to 54 detect the same object candidate in a duplicated manner.

FIG. 3 shows an example of detection profile information associating object candidates with detectors. As shown in FIG. 3, an object candidate B (a box of confectionery) is associated with the LineMode detector 51 and the PnP detector 52. As a result, the LineMode detector 51 detects the object B based on a contour shape (such as a size) of the object candidate B and the PnP detector 52 also detects the object candidate B based on a texture of the object candidate B. Therefore, by detecting the single object candidate B (i.e., the same object candidate B) by using the LineMode detector 51 and the PnP detector 52 having different characteristics in a duplicated manner, it is possible to prevent object candidates from being undetected even further.

Similarly, an object candidate C (a bowl) is associated with the LineMode detector 51 and the SHOT detector 53. As a result, the LineMode detector 51 detects the object candidate C based on a contour shape (such as a size) of the object candidate C and the SHOT detector 53 also detects the object candidate based on a curvature change in a local 3D-shape of the object candidate C. Therefore, by detecting the single object candidate C by using the LineMode detector 51 and the SHOT detector 53 having different characteristics in a duplicated manner, it is possible to prevent object candidates from being undetected even further.

Note that the object candidate A is associated only with the LineMode detector 51. This is because the object candidate A can be reliably detected by using the LineMode detector 51 alone. Meanwhile, the object candidate D is associated only with the Bayse detector 54. This is because since the object candidate D is black, its distance information cannot be acquired. Therefore, the LineMode detector 51 cannot detect the object candidate D and hence it is not associated with the LineMode detector 51. However, the Bayse detector 54 can reliably detect the object candidate D based on RGB brightness information of the object candidate D alone. Therefore, the object candidate D is associated only with the Bayse detector 54.

As described above, it is possible to prevent object candidates from being undetected even further by associating two or more of the detectors 51 to 54 having different characteristics with a single object candidate according to feature information indicating features of the object candidate and detecting the object candidate by using these two or more of the detectors 51 to 54.

Further, each of the detectors 51 to 54 of the object detection unit 5 detects a position/posture candidate of the object candidate based on feature values of a target object image acquired by the image information acquisition unit 2 and feature values of a model image of the detected object candidate.

As a result, each of the detectors 51 to 54 of the object detection unit 5 detects only an object candidate optimal for its detection and also detects a position/posture candidate of the optimal object candidate. Consequently, it is possible to prevent the position/posture of the object to be recognized from being undetected and thereby to improve the recognition accuracy.

For example, each of the detectors 51 to 54 of the object detection unit 5 associates feature values of a target object image with feature values of a model image of the detected object candidate by using k-nearest neighbor method and then detects a position/posture candidate of the object candidate based on its geometric structure by using an RANSAC (Random Sample Consensus) method.

Note that the above-described method for detecting an object and the method for calculating its position/posture are merely examples and the methods are not limited to the aforementioned methods.

As explained above, the object detection unit 5 detects an object candidate and its position/posture candidate by using at least one of the detectors 51 to 54. The object detection unit 5 of the object recognition apparatus 1 outputs an object candidate and its position/posture candidate detected by each of the detectors 51 to 54 as an object to be recognized and its position/posture.

Note that in the above-described first embodiment, the object detection unit 5 detects an object candidate of an object to be recognized and its position/posture candidate. However, the object to be detected is not limited to the above-described example. That is, the object detection unit 5 may detect only an object candidate of an object to be recognized.

By using the object recognition apparatus 1 according to the first embodiment, the recall (i.e., an index indicating a detection rete and an undetected rate) was able to be improved by about 18% compared to an object recognition apparatus in related art.

Second Embodiment

Figure 4:
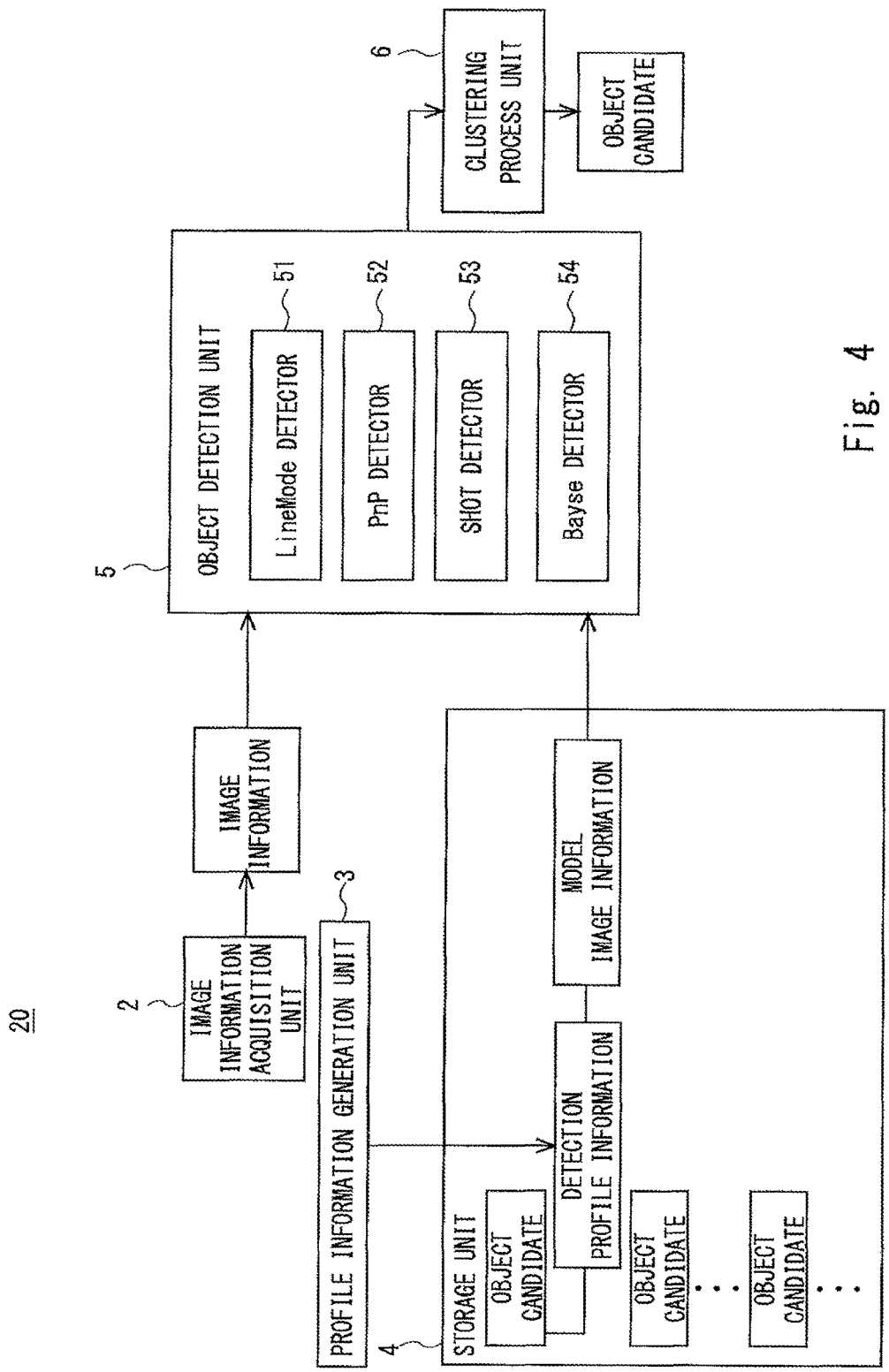
FIG. 4 is a block diagram showing a schematic system configuration of an object recognition apparatus according to a second embodiment of the present disclosure.

FIG. 4 is a block diagram showing a schematic system configuration of an object recognition apparatus according to a second embodiment of the present disclosure. An object recognition apparatus 20 according to a second embodiment further includes, in addition to the components/structures of the object recognition apparatus 1 according to the above-described first embodiment, a clustering process unit 6 that performs a clustering process in which similar candidates among object candidates and position/posture candidates (hereinafter also referred to as "object position/posture candidates") detected by the object detection unit 5 are unified as an identical candidate. As a result, since similar candidates in a group of object position/posture candidates detected by the object detection unit 5 can be unified into one candidate and output for a user, the usability is improved.

Figure 5:
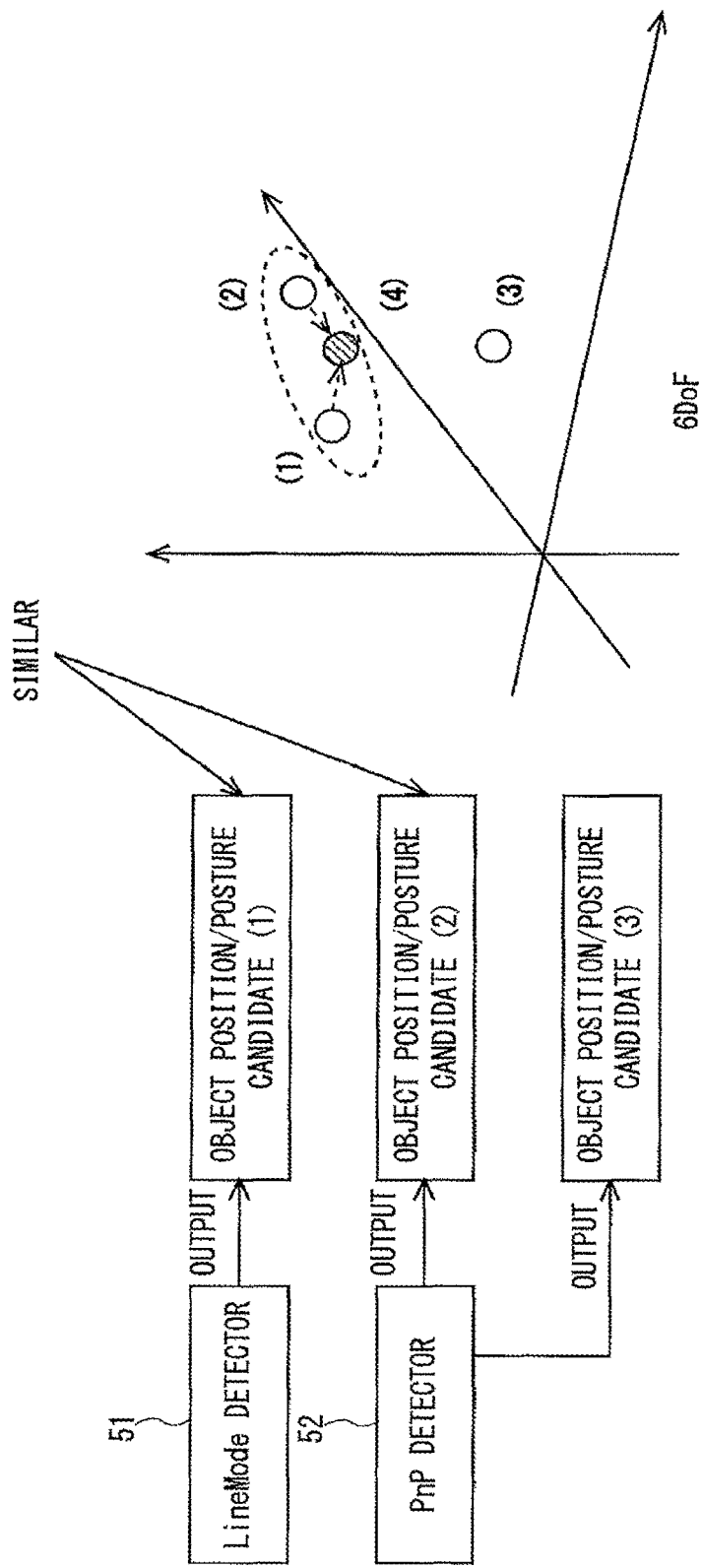
FIG. 5 is diagram for explaining a clustering process.

The clustering process unit 6 is a specific example of the clustering process means. For example, as shown in FIG. 5, the object detection unit 5 detects object position/posture candidates (1) to (3) of an object to be recognized by using, for example, a plurality of selected detectors (e.g., the LineMode detector 51 and the PnP detector 52). The clustering process unit 6 performs a clustering process in which similar candidates among the object position/posture candidates (1) to (3) detected by the object detection unit 5 are unified as an identical candidate. Specifically, the clustering process unit 6 performs the clustering process by using a MeanShfit method or the like. In the MeanShfit method, the distance between the object position/posture candidates (1) and (2) is short and hence they are similar to each other as shown in FIG. 5. Therefore, the object position/posture candidates (1) and (2) are unified into an object position/posture candidate (4) that is an average of them. Note that since there is no candidate similar to the object position/posture candidate (3), it is not unified with any other candidate.

The object recognition apparatus 1 outputs the object position/posture candidate unified by the clustering process unit 6 as the object to be recognized and its position/posture. Note that in the second embodiment, the same symbols as those of the above-described first embodiment are assigned to the same parts as those of the first embodiment and their explanations are omitted.

Third Embodiment

Figure 6:
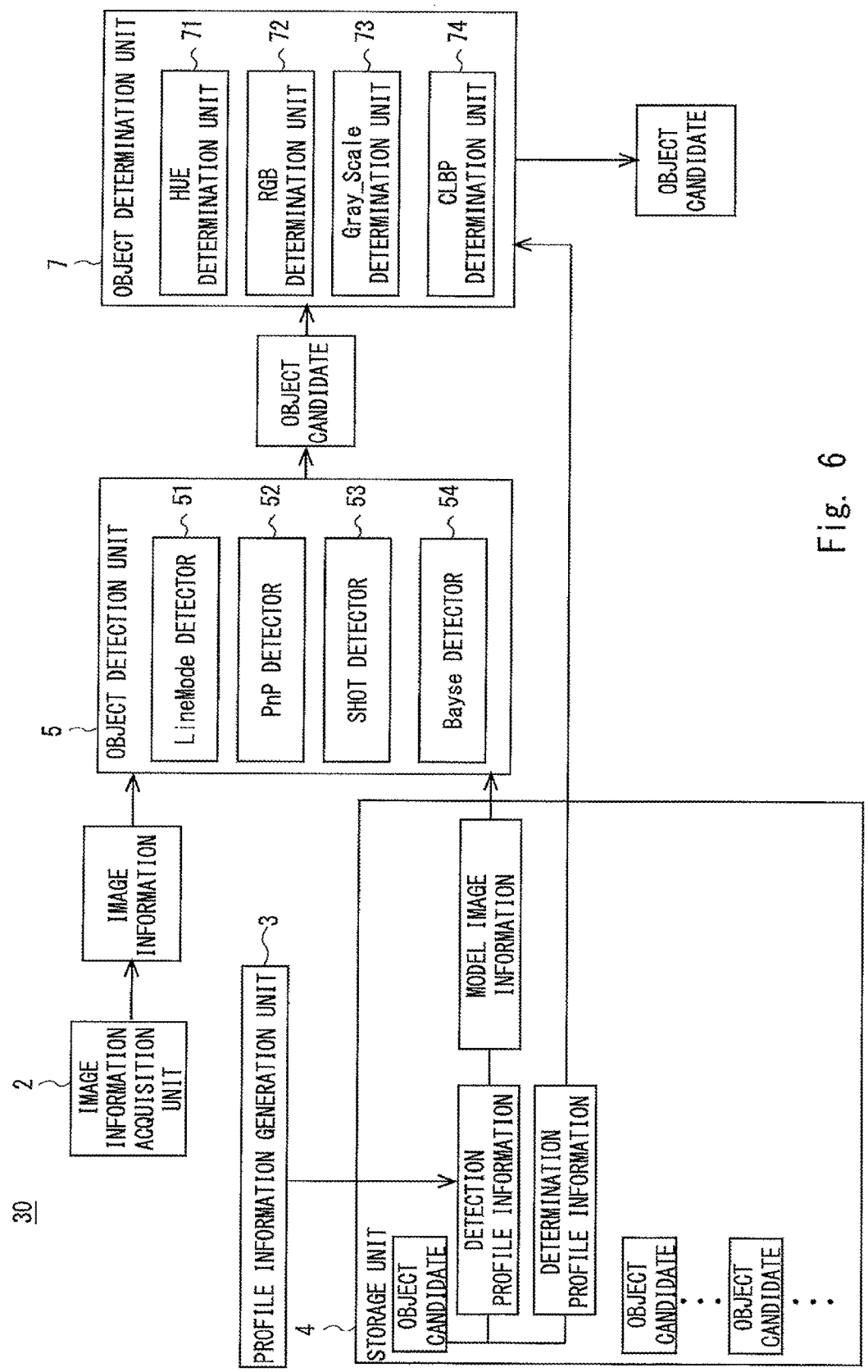
FIG. 6 is a block diagram showing a schematic system configuration of an object recognition apparatus according to a third embodiment of the present disclosure.

FIG. 6 is a block diagram showing a schematic system configuration of an object recognition apparatus according to a third embodiment of the present disclosure. An object recognition apparatus 30 according to a third embodiment further includes, in addition to the components/structures of the object recognition apparatus 1 according to the above-described first embodiment, an object determination unit 7 that determines an object position/posture candidate detected by the object detection unit 5 based on at least one of its color information and distance information.

In order to reduce false detection of an object position/posture candidate by the object detection unit 5, after the object detection unit 5 detects an object position/posture candidate, the object determination unit 7 further determines the object position/posture candidate (i.e., determines whether the object position/posture candidate is correct or not) based on at least one of its color information and distance information. In this determination process, the object determination unit 7 determines whether or not a model image matches a target object image by comparing their color information and distance information on a pixel-by-pixel basis.

The object determination unit 7 is a specific example of the object determination means. The object determination unit 7 makes determination by comparing at least one of distance information and color information of a target object image acquired by image information acquisition unit 2 with at least one of color information and distance information of model image information of an object position/posture candidate output from the object detection unit 5.

For example, the object determination unit 7 performs a rendering process or the like and thereby compares the above-described target object image and the model image. In this rendering process, the object determination unit 7 projects a 3D-object in the model image (a 3D-object that is registered as a model in advance) onto the target object image based on the object position/posture candidate detected by the object detection unit 5.

The object determination unit 7 compares, for each object position/posture candidate, its model image with the target object image. Based on the comparison between the target object image and the model image, the object determination unit 7 outputs an object position/posture candidate having reliability equal to or larger than a predetermined value among the object position/posture candidates detected by the object detection unit 5 as the object to be recognized and its position/posture.

For example, the object determination unit 7 compares distance information of a target object image acquired by the image information acquisition unit 2 with distance information of a model image of an object position/posture candidate detected by the object detection unit 5. Then, when a difference in the degree of matching is equal to or larger than a determination threshold, the object determination unit 7 determines that its reliability is equal to or larger than the predetermined value.

Alternatively, for example, the object determination unit 7 compares color information of a target object image acquired by the image information acquisition unit 2 (at least one of the below-shown information items (A) to (D)) with color information of a model image of an object position/posture candidate detected by the object detection unit 5. Then, when a difference in the degree of matching is equal to or larger than a determination threshold, the object determination unit 7 determines that the object position/posture candidate has reliability equal to or larger than the predetermined value. Note that the object determination unit 7 may determine that the object position/posture candidate has reliability equal to or larger than a predetermined value when the above-described difference in the degree of mismatching is equal to or smaller than a determination threshold.

The object recognition apparatus 1 outputs the object position/posture candidate that the object determination unit 7 has determined to have reliability equal to or larger than the predetermined value as the object to be recognized and its position/posture. Note that the above-described determination threshold is defined in advance in the storage unit 4 or the like and configured so that a user can arbitrarily change the definition.

The object determination unit 7 includes determination units having different characteristics defined in later-described determination profile information. For example, the object determination unit 7 includes a hue determination unit 71, an RGB determination unit 72, a Gray_Scale determination unit 73, and a CLBP determination unit 74.

(A) Hue

The hue determination unit 71 converts RGB brightness information into HSV information (i.e., color-space information including three components, i.e., Hue, Saturation/Chroma, and Value/Lightness/Brightness), and performs the above-described comparison by using its hue H. The hue determination unit 71 can reduce false determination when it makes, by the same simple color, determination of an yellow, red, blue, green, magenta, or cyan object (such as a cup).

(B) RGB

The RGB determination unit 72 performs the above-described comparison by using a raw value of RGB brightness information. The RGB determination unit 72 can reduce false determination when it makes determination of an object having a composite color (such as a composite color of white and yellowish green) or a black object (such as a remote controller).

(C) Gray Scale

The Gray_Scale determination unit 73 converts RGB brightness information into gray-scale information (white/black information) and performs the above-described comparison by using the converted value (i.e., the value obtained by converting the RGB brightness information). The Gray_Scale determination unit 73 can reduce false determination when it makes determination of an object having a white-based color (such as bowl).

(D) CLBP (Color Local Binary Pattern)

Figure 7:
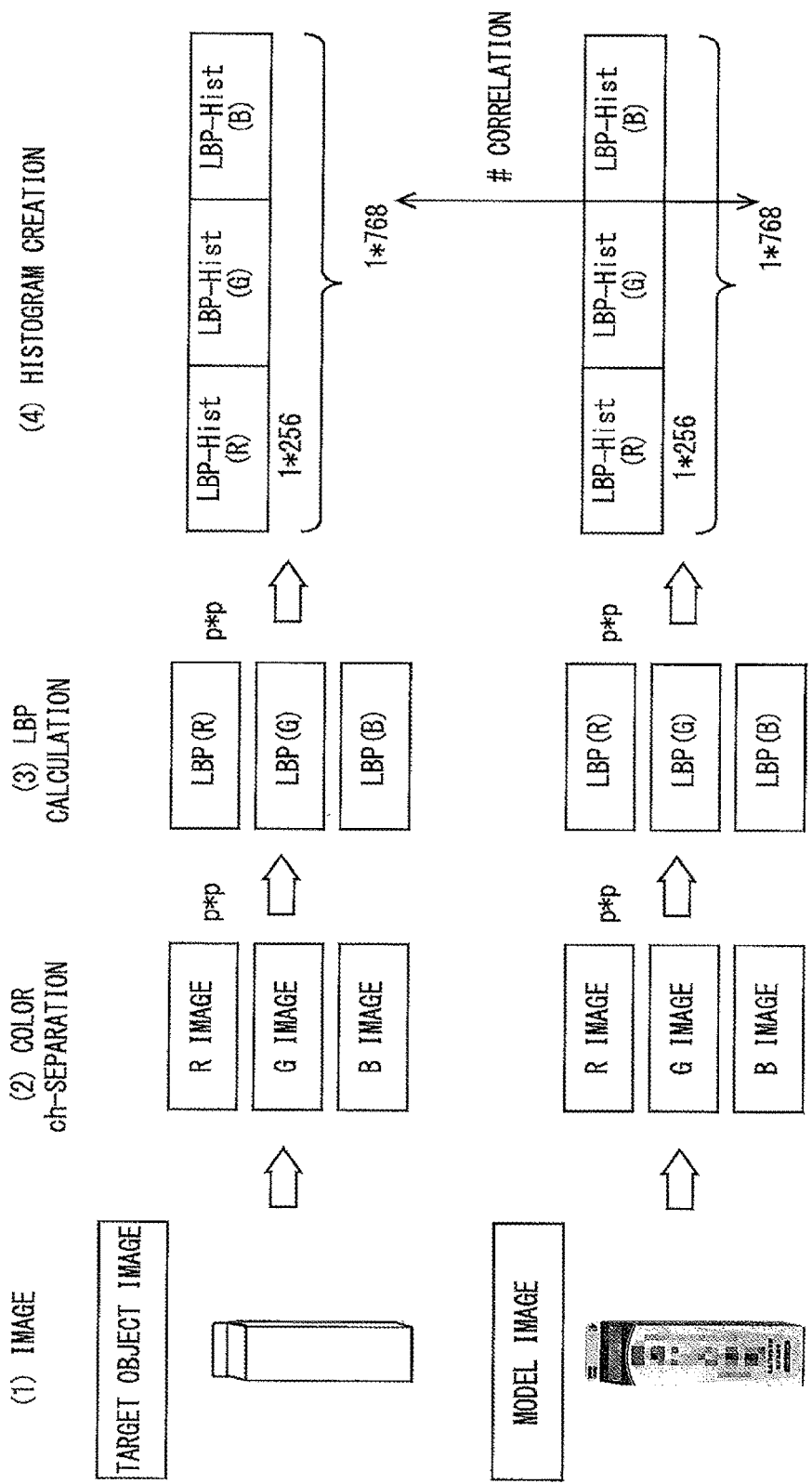
FIG. 7 is diagram for explaining a determination method performed by a CLBP determination unit.

As shown in FIG. 7, the CLBP determination unit 74 performs color-channel separation (separation into an R-image, a G-image, and a B-image) for each of a target object image and a model image ((2) in the figure), and calculates LBP of each channel (i.e., LBP (R), LBP (G), and LBP (B)) ((3) in the figure). Then, the CLBP determination unit 74 creates a histogram based on the calculated LBP ((4) in the figure) and performs the above-described comparison by using the created histogram. Note that the LBP is tolerant to variations in the illumination for the image. By converting the LBP into a histogram, it becomes more tolerant to perturbation that occurs when the above-described rendering is carried out, thus improving the determination accuracy. The CLBP determination unit 74 can reduce false determination when it makes determination of an object having a texture.

Note that the above-described determination units are merely examples and the determination units are not limited to the aforementioned determination units. That is, the object determination unit 7 may include arbitrary determination units, and the number and the type of determination units may be arbitrarily determined.

It should be noted that as described above, similar to the above-described detector, there are objects that the determination unit is good at making determination and those that the determination unit is not good at making determination. Therefore, depending on the used determination unit, there is a possibility that a false determination is made (such as determining an object (i.e., determining that a detected object is correct) that should not be determined as the object). For example, the RGB determination unit is more likely to make false determination when there is a disturbance (i.e., RGB brightness variations).

To cope with this problem, in the object recognition apparatus 30 according to the third embodiment, the storage unit 4 stores determination profile information that associates object candidates with determination units 71 to 74 capable of making determination for the object candidates. The object determination unit 7 determines whether or not an object candidate detected by the object detection unit 5 has reliability equal to or larger than a predetermined value by selecting one of the determination units 71 to 74 corresponding to the object candidate based on the determination profile information stored in the storage unit 4 and comparing at least one of color information and distance information of image information of the object to be recognized acquired by the image information acquisition unit 2 with at least one of color information and distance information of model image information of the object candidate output from the object detection unit 5 by using the selected one of the determination units 71 to 74. The object determination unit 7 outputs the object candidate that has been determined to have reliability equal to or larger than the predetermined value as the object to be recognized.

As a result, each of the determination units 71 to 74 performs determination for an object candidate and its position/posture candidate optimal for its determination that is defined in advance in the determination profile information. Therefore, it is possible to reduce false detection of an object to be recognized and thereby improve the recognition accuracy even further.

The storage unit 4 stores determination profile information associating each of object candidates with at least one of the determination units 71 to 74. In the determination profile information, each object candidate is associated with at least one of the determination units 71 to 74 based on feature information indicating features of the object candidate including at least one of color information (such as a same simple color, a composite color, or an object color) and inscription information (such as whether or not there is a texture) of the object candidate.

FIG. 8 shows an example of determination profile information associating object candidates with determination units. As shown in FIG. 8, an object candidate A has a composite color of white and yellowish green. Therefore, the RGB determination unit 72 that can excellently determine a composite color is associated with the object candidate A. An object candidate B has a texture. Therefore, the CLBP determination unit 74 that can excellently determine a texture is associated with the object candidate B. An object candidate C has a white-based color. Therefore, the Gray Scale determination unit 73 that can excellently determine a white-based color is associated with the object candidate C. An object candidate D is black. Therefore, the RGB determination unit 72 that can excellently determine black is associated with the object candidate D. An object candidate E is yellow. Therefore, the hue determination unit 71 that can excellently determine yellow is associated with the object candidate E.

For example, the profile information generation unit 3 selects one of the plurality of predefined determination units 71 to 74 that is optimal for determining the object candidate and associates the object candidate with the selected one of the determination units 71 to 74 in accordance with, for example, a flowchart shown in FIG. 9.

The profile information generation unit 3 determines whether or not the color of the object candidate is mainly the same simple color based on image information of the object candidate acquired by the image information acquisition unit 2 (step S201). Note that the "mainly the same simple color" means, for example, the size ratio of an area having the simple color is high and is equal to or higher than a certain value.

When the profile information generation unit 3 determines that the color of the object candidate is mainly the same simple color (Yes at step S201), it determines whether or not the color of the object candidate is one of yellow, red, blue, green, magenta, and cyan based on the image information of the object candidate acquired by the image information acquisition unit 2 (step S202). On the other hand, when the profile information generation unit 3 determines that the color of the object candidate is not the same simple color (No at step S201), it moves to a later-describe step (to a step S204).

When the profile information generation unit 3 determines that the color of the object candidate is one of yellow, red, blue, green, magenta, and cyan (Yes at step S202), it selects the hue determination unit 71 (step S203).

When the profile information generation unit 3 determines that the color of the object candidate is not any of yellow, red, blue, green, magenta, and cyan (No at step S202), it determines whether or not the object candidate has inscription information based on the image information of the object candidate acquired by the image information acquisition unit 2 (step S204).

When the profile information generation unit 3 determines that the object candidate has inscription information (Yes at step S204), it selects CLBP determination unit (step S205). On the other hand, when the profile information generation unit 3 determines that the object candidate has no inscription information (No at step S204), it determines whether or not the color of the object candidate is a white-based color or a gray-based color based on the image information of the object candidate acquired by the image information acquisition unit 2 (step S206). Note that the "white-based color or gray-based color" means, for example, the size ratio of a white or gray area is high and is equal to or higher than a certain value.

When the profile information generation unit 3 determines that the color of the object candidate is a white-based or gray-based color (Yes at step S206), it selects the Gray_Scale determination unit 73 (step S207). On the other hand, when the profile information generation unit 3 determines that the color of the object candidate is neither a white-based color nor a gray-based color (No at step S206), it selects the RGB determination unit 72 (step S208).

In this way, by the profile information generation unit 3, it is possible to automatically generate determination profile information associating an object candidate with one of the determination units 71 to 74 that is optimal for determining that object candidate based on feature information indicating a feature of the object candidate including at least one of color information and inscription information of the object candidate.

The profile information generation unit 3 generates determination profile information associating an object candidate with one of the determination units 71 to 74 in accordance with the above-described flow and stores the generated determination profile information in the storage unit 4. Note that determination profile information associating an object candidate and one of the determination units 71 to 74 optimal for determining that object candidate may be stored in advance in the storage unit 4. Further, a user may select one of the determination units 71 to 74 in accordance with the above-described flowchart. The determination profile information stored in the storage unit 4 can be configured so that, for example, a user can arbitrarily change a definition in the determination profile information.

In the determination profile information stored in the storage unit 4, one object candidate may be associated with two or more of the determination units 71 to 74. In such a case, these two or more of the determination units 71 to 74 determines the same object candidate in a duplicated manner. In this way, it is possible to reduce false determination of an object candidate even further by associating two or more of the determination units 71 to 74 having different characteristics with a single object candidate according to feature information indicating features of the object candidate and determining the object candidate by using these two or more of the determination units 71 to 74.

As explained above, the object determination unit 7 determines an object candidate and its position/posture candidate by using at least one of the determination units 71 to 74. The object determination unit 7 of the object recognition apparatus 1 outputs an object candidate and its position/posture candidate that each of the determination units 71 to 74 has determined to have reliability equal to or larger than a predetermined value as the object to be recognized and its position/posture.

Note that in the above-described third embodiment, the object determination unit 7 determines an object candidate of an object to be recognized and its position/posture candidate. However, the object to be determined is not limited to the above-described example. That is, the object determination unit 7 may determine only an object candidate of an object to be recognized.

By using the object recognition apparatus 30 according to the third embodiment, the precision (i.e., an index indicating a rate of correct results and a rate of false detection) was able to be improved by about 18% compared to an object recognition apparatus in related art.

In the third embodiment, the same symbols as those of the above-described first and second embodiments are assigned to the same parts as those of the first and second embodiments and their explanations are omitted.

Fourth Embodiment

Figure 10:
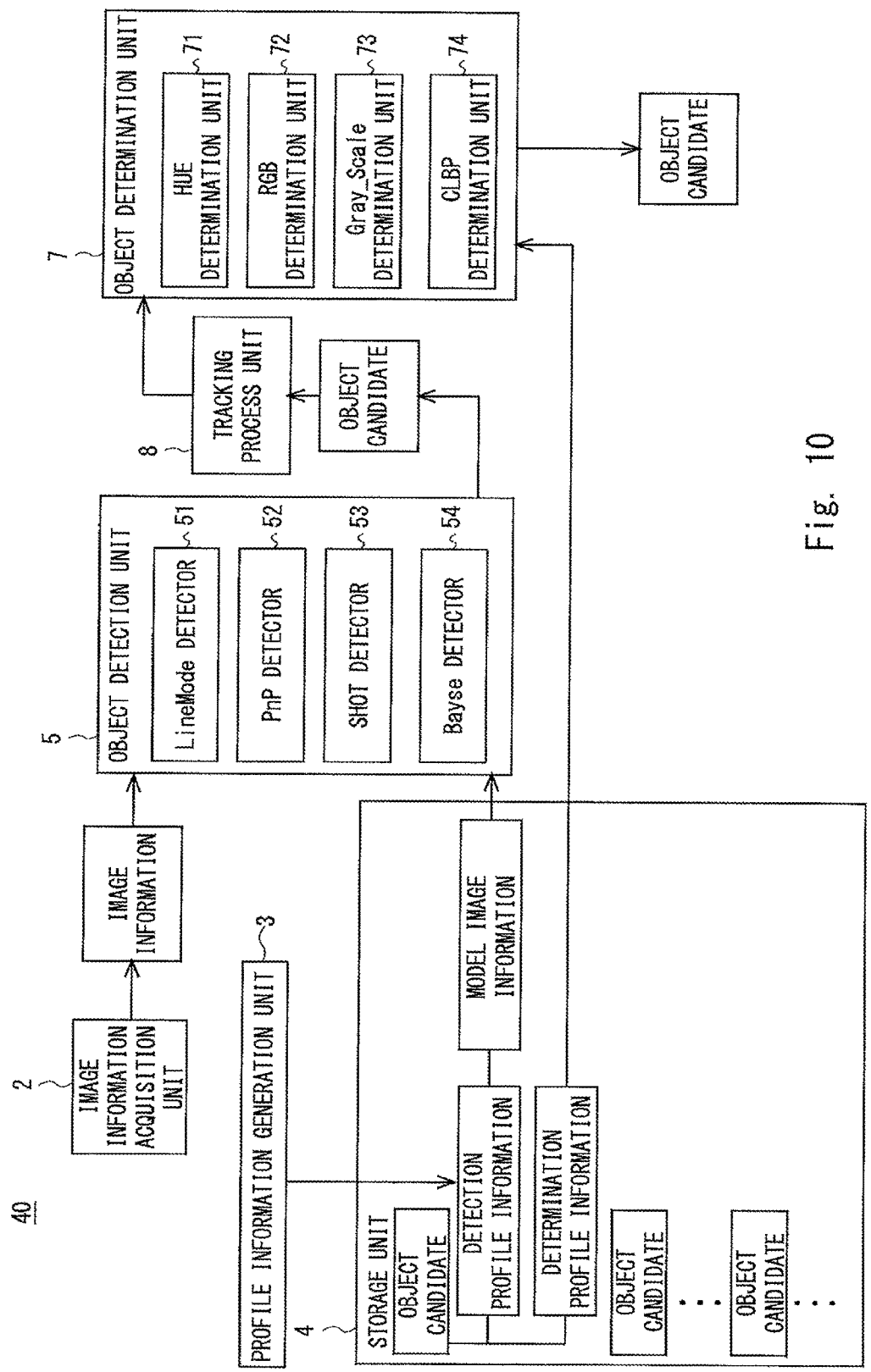
FIG. 10 is a block diagram showing a schematic system configuration of an object recognition apparatus according to a fourth embodiment of the present disclosure.

FIG. 10 is a block diagram showing a schematic system configuration of an object recognition apparatus according to a fourth embodiment of the present disclosure. An object recognition apparatus 40 according to a fourth embodiment further includes, in addition to the components/structures of the object recognition apparatus 30 according to the above-described third embodiment, a tracking process unit 8 that tracks (i.e., keeps track of) an object position/posture candidate detected by the object detection unit 5 based on geometric shape information of the object.

When a determination is made by the above-described object determination unit 7, if the position/posture is not accurately estimated, a pixel error could occur between the target object image and the model image. As a result, false determination is more likely to occur. Therefore, in the fourth embodiment, tracking is performed based on geometric information of the object position/posture candidate before the object determination unit 7 makes determination. As a result, the position/posture can be accurately estimated and false determination can be reduced even further.

The tracking process unit 8 is a specific example of the tracking process means. The tracking process unit 8 performs, for example, ICP (Iterative Closest Point) tracking (i.e., a tracking process using an ICP algorithm) to keep track of an object position/posture candidate based on geometric information of the object position/posture candidate.

Figure 11:
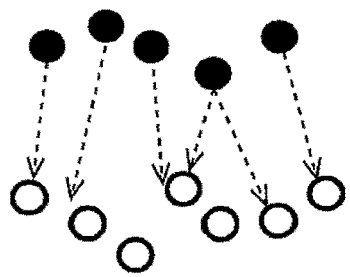
FIG. 11 is diagram for explaining association of point clouds.
Figure 12:
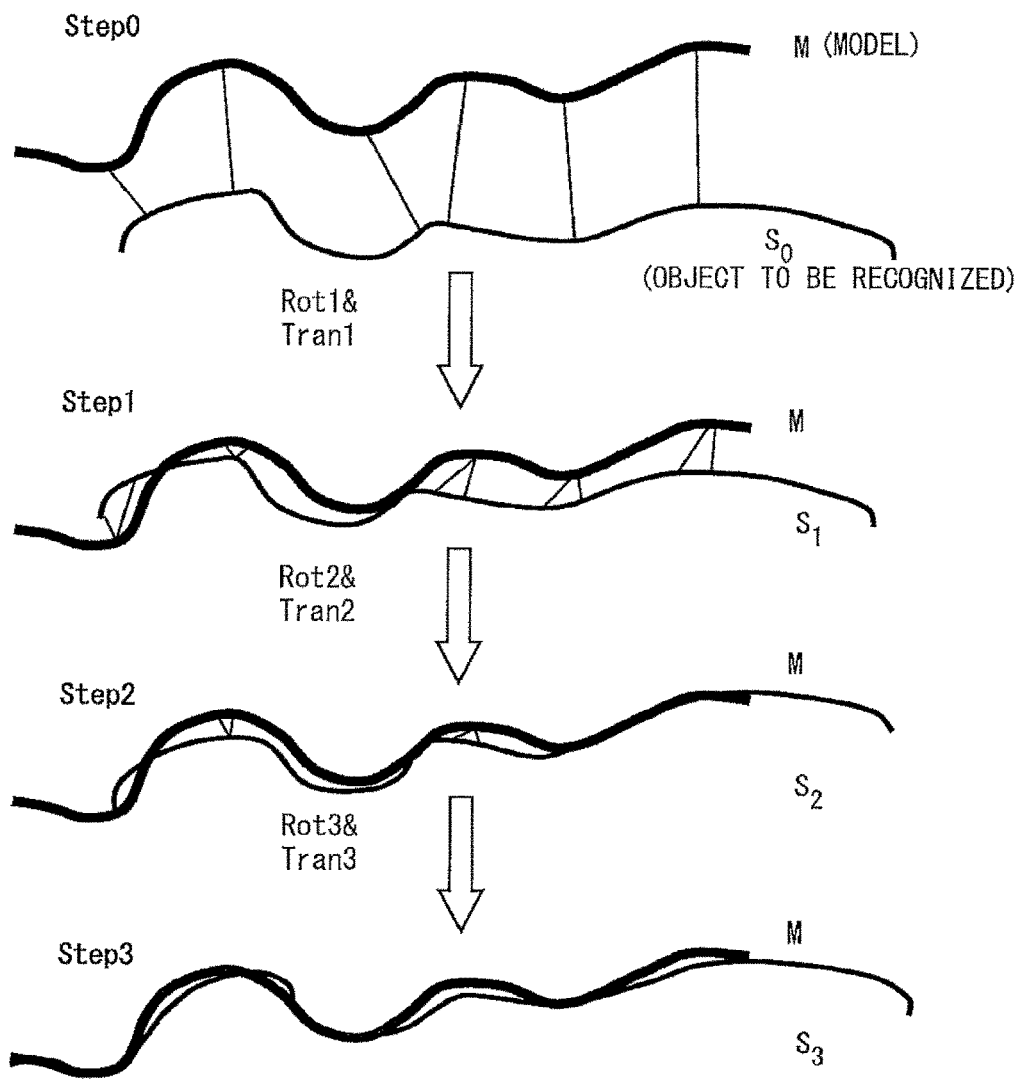
FIG. 12 shows an example of a technique for obtaining a geometric quantity between a model of an object position/posture candidate and an object to be recognized.

The ICP tracking is a technique in which, for example, a point cloud of a model of a model image of an object position/posture candidate is associated with a point cloud of an object to be recognized of a target object image as shown in FIG. 11, and geometric quantities (rotation and translation quantities) between the model of the model image of the object position/posture candidate and the object to be recognized of the target object image are obtained by using a least-square method so that the error is reduced as shown in FIG. 12.

Figure 13:
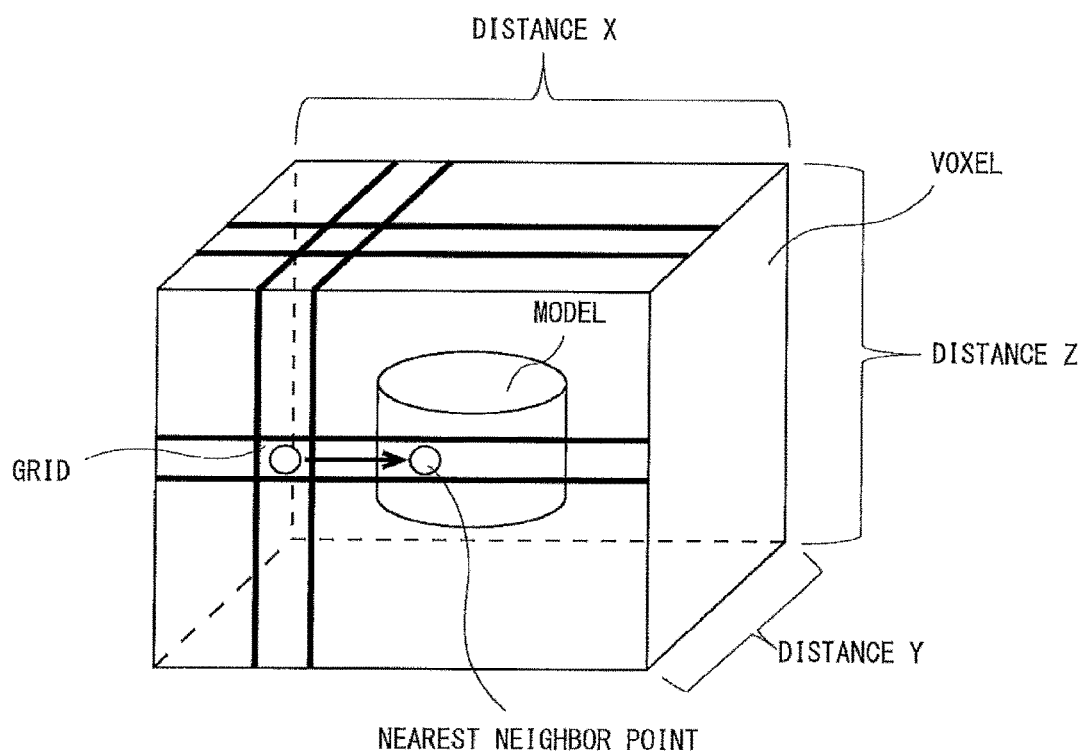
FIG. 13 shows an example of a grid of a three-dimensional voxel.

Note that, in general, the ICP tracking is a process that requires a large calculation cost. Therefore, in the fourth embodiment, a nearest neighbor point necessary for ICP tracking is calculated in advance and the ICP tracking is performed by using this nearest neighbor point. Note that, first of all, it is necessary to associate the aforementioned point. Therefore, in this technique, for example, a 3D-voxel is formed for a model of a model image (i.e., 3D-grid voxel enclosing a model is formed) and a nearest neighbor point on the model from each grid to the model is calculated in advance as shown in FIG. 13. Then, information about the calculated nearest neighbor point (e.g., coordinates of the nearest neighbor point or an Index of the nearest neighbor point) is stored in association with each voxel in the storage unit 4.

Note that while information of the nearest neighbor point to the object to be recognized is stored for each voxel, points in a range outside the voxel are ignored. In the fourth embodiment, although the nearest neighbor point is from a point to a plane, it is not limited to this example. That is, the nearest neighbor point may be from a point to a point. Distances X, Y and Z in FIG. 13 can be determined from the number of grids in each side of the voxel and the unit of the lattice (several mm). As described above, a nearest neighbor point necessary for ICP tracking is calculated and information of this nearest neighbor point is stored in the storage unit 4 before the actual ICP tracking is performed. Then, the tracking process unit 8 performs the ICP tracking in real time by using the information of the nearest neighbor point stored in the storage unit 4 as described above. As a result, the calculation cost necessary for the ICP tracking can be significantly reduced.

The tracking process unit 8 performs the above-described ICP tracking. Then, for example, when an obtained geometric quantity is equal to or larger than a predetermined quantity, the tracking process unit 8 discards the object position/posture candidate from the object position/posture candidates detected by the object detection unit 5 because its geometric shape is inconsistent. The tracking process unit 8 outputs object position/posture candidates that are obtained by eliminating the discarded object position/posture candidate from the object position/posture candidates detected by the object detection unit 5 to the object determination unit 7. The object determination unit 7 makes the above-described determination by comparing at least one of distance information and color information of a target object image acquired by image information acquisition unit 2 and at least one of color information and distance information of model image information of an object position/posture candidate output from the tracking process unit 8.

In the fourth embodiment, the same symbols as those of the above-described first to third embodiments are assigned to the same parts as those of the first to third embodiments and their explanations are omitted.

Note that the present disclosure is not limited to the above-described embodiments, and various modifications can be made without departing from the spirit and scope of the present disclosure.

Figure 14:
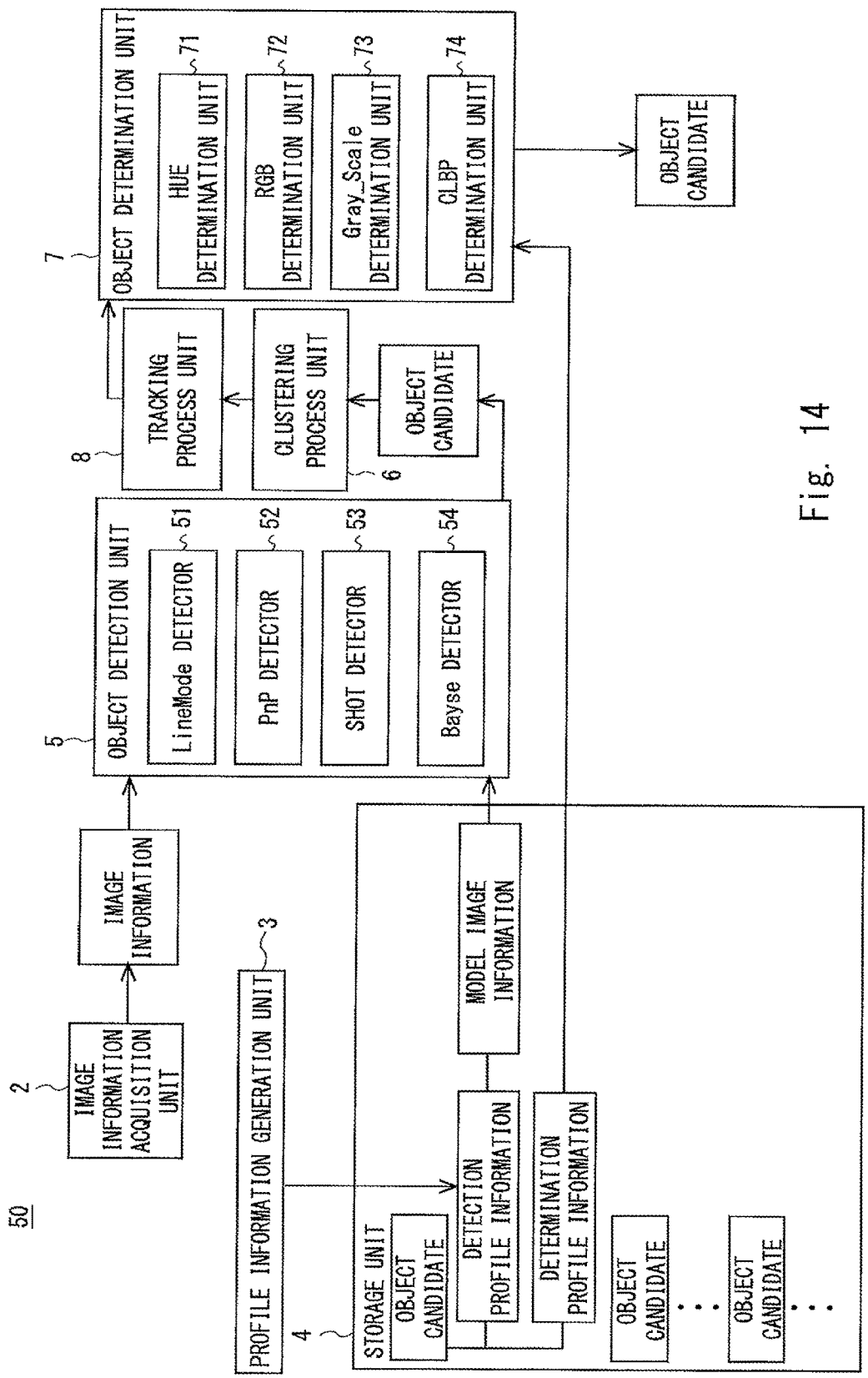
FIG. 14 shows an example of a configuration in which the first to fourth embodiments are combined.

The above-described first to fourth embodiments may be arbitrarily combined with one another. For example, an object recognition apparatus 50 may include the image information acquisition unit 2, the profile information generation unit 3, the storage unit 4, the object detection unit 5, the clustering process unit 6, the object determination unit 7, and the tracking process unit 8 (FIG. 14). In this case, it is possible to prevent an object to be recognized from being undetected and prevent false detection in a best way, and thereby to improve the recognition accuracy.

The object detection unit 5 detects an object candidate and its position/posture candidate by using the detectors 51 to 54 and outputs them to the clustering process unit 6. The clustering process unit 6 unifies similar candidates among the object position/posture candidates detected by the object detection unit 5 and outputs a group of unified object position/posture candidates to the tracking process unit 8. The tracking process unit 8 performs ICP tracking to keep track of the object position/posture candidates received from the clustering process unit 6 and outputs the ICP-tracked object position/posture candidates to the object determination unit 7. The object determination unit 7 makes determination for the object position/posture candidate received from the tracking process unit 8 by using the determination units 71 to 74 and outputs the determined object position/posture candidate as the position/posture of the object to be recognized.

In the present disclosure, for example, at least one of the processes performed by the above-described profile information generation unit 3, the object detection unit 5, the clustering process unit 6, the object determination unit 7, and the tracking process unit 8 can be implemented by causing a CPU or a GPU (Graphics Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An object recognition apparatus comprising:
    a processor configured to:
    acquire image information of an object to be recognized;
    store detection profile information associating an object candidate with a detector capable of detecting the object candidate, and model image information of the object candidate associated with the object candidate, the object candidate being a candidate for the object to be recognized; and
    operate as a plurality of detectors defined in the detection profile information, each of the detectors being configured to detect the object to be recognized based on the acquired image information, wherein
    each of the detectors is configured to detect the object candidate by comparing the model image information of the object candidate associated with the detector in the detection profile information with the acquired image information of the object to be recognized and output the detected object candidate as the object to be recognized, and
    the processor is further configured to:
    store determination profile information associating the object candidate with a determination unit capable of determining the object candidate;
    operate as a plurality of determination units defined in the determination profile information, each of the determination units configured to determine the object candidate output from the detectors based on the acquired image information; and
    select a determination unit corresponding to the object candidate detected by the detectors based on the stored determination profile information.

2. The object recognition apparatus according to claim 1, the processor is further configured to:
    determine whether or not the object candidate has a reliability equal to or larger than a predetermined value by comparing at least one of color information and distance information of the acquired image information of the object to be recognized with at least one of color information and distance information of the model image information of the object candidate output from the detectors, and
    output the object candidate that is determined to have reliability equal to or larger than the predetermined value as the object to be recognized.

3. The object recognition apparatus according to claim 1, wherein the processor is further configured to detect a position and posture candidate of the object candidate based on a feature value of the acquired image information of the object to be recognized and a feature value of the model image information of the detected object candidate.

4. The object recognition apparatus according to claim 3, wherein the processor is further configured to unify similar candidates among object candidates and position and posture candidates detected by the detectors as an identical candidate.

5. The object recognition apparatus according to claim 3, wherein
    the processor is further configured to perform a tracking process and output a tracking-processed object candidate and its position and posture candidate, and the tracking process includes
obtaining a geometric quantity between a model of a model image of the object candidate and the position and posture candidate detected by the detectors and the object to be recognized of the image information, and
eliminating an object candidate and a position and posture candidate for which the obtained geometric quantity is equal to or larger than a predetermined quantity from the object candidates and the position and posture candidates detected by the detectors.

6. The object recognition apparatus according to claim 5, wherein the processor is further configured to:
store information of a nearest neighbor point on the model in the model image from each grid of a three-dimensional voxel enclosing the model to the model, and
perform the tracking process by using the stored information of the nearest neighbor point.

7. The object recognition apparatus according to claim 2, wherein
the processor is further configured to generate at least one of the detection profile information and the determination profile information,
the detection profile information associates the object candidate with at least one detector based on feature information indicating a feature of the object candidate including at least one of color information, shape information, inscription information, and physical-property information of the object candidate, and
the determination profile information associates the object candidate with at least one determination unit based on feature information indicating a feature of the object candidate including at least one of color information and inscription information of the object candidate.

8. An object recognition method comprising:
acquiring image information of an object to be recognized;
storing detection profile information associating an object candidate with a detector capable of detecting the object candidate, and model image information of the object candidate associated with the object candidate, the object candidate being a candidate for the object to be recognized; and
detecting the object to be recognized by using a plurality of detectors defined in the detection profile information based on the acquired image information, wherein
each of the detectors detects the object candidate by comparing the model image information of the object candidate associated with the detector in the detection profile information with the acquired image information of the object to be recognized and outputs the detected object candidate as the object to be recognized, and
the method further comprises:
storing determination profile information associating the object candidate with a determination unit capable of determining the object candidate;
determining the object candidate output from the detectors based on the acquired image information by using a plurality of determination units defined in the determination profile information; and
selecting a determination unit corresponding to the object candidate detected by the detectors based on the stored determination profile information.

9. A non-transitory computer readable medium storing program for causing a computer to execute:
a process of acquiring image information of an object to be recognized;
a process of storing detection profile information associating an object candidate with a detector capable of detecting the object candidate, and model image information of the object candidate associated with the object candidate, the object candidate being a candidate for the object to be recognized; and
a process of detecting the object to be recognized by using a plurality of detectors defined in the detection profile information based on the acquired image information, wherein
each of the detectors detects the object candidate by comparing the model image information of the object candidate associated with the detector in the detection profile information with the acquired image information of the object to be recognized and outputs the detected object candidate as the object to be recognized, and
the program further causes the computer to execute:
a process of storing determination profile information associating the object candidate with a determination unit capable of determining the object candidate;
a process of determining the object candidate output from the detectors based on the acquired image information by using a plurality of determination units defined in the determination profile information; and
a process of selecting a determination unit corresponding to the object candidate detected by the detectors based on the stored determination profile information.

* * * * *